US012010242B2

(12) United States Patent
Avanzi et al.

(10) Patent No.: US 12,010,242 B2
(45) Date of Patent: Jun. 11, 2024

(54) MEMORY PROTECTION USING CACHED PARTIAL HASH VALUES

(71) Applicant: Arm Limited, Cambridge (GB)

(72) Inventors: Roberto Avanzi, Munich (DE); Andreas Lars Sandberg, Cambridge (GB); Michael Andrew Campbell, Cambridge (GB); Matthias Lothar Boettcher, Cambridge (GB); Prakash S. Ramrakhyani, Austin, TX (US)

(73) Assignee: Arm Limited, Cambridge (GB)

( * ) Notice: Subject to any disclaimer, the term of this patent is extended or adjusted under 35 U.S.C. 154(b) by 250 days.

(21) Appl. No.: 16/925,723

(22) Filed: Jul. 10, 2020

(65) Prior Publication Data

US 2022/0014379 A1 Jan. 13, 2022

(51) Int. Cl.
*H04L 9/32* (2006.01)
*G06F 21/57* (2013.01)
(Continued)

(52) U.S. Cl.
CPC ............ *H04L 9/3242* (2013.01); *G06F 21/57* (2013.01); *G06F 21/64* (2013.01); *H04W 12/06* (2013.01);
(Continued)

(58) Field of Classification Search
CPC ... H04L 9/3242; H04L 9/3236; H04L 9/3247; G06F 21/57; G06F 21/64;
(Continued)

(56) References Cited

U.S. PATENT DOCUMENTS 6,266,705 B1 * 7/2001 Ullum ..................... H04L 45/00
711/216
6,629,198 B2 * 9/2003 Howard .............. G06F 11/1471
714/E11.13
(Continued)

FOREIGN PATENT DOCUMENTS

CN 1989498 B * 10/2012 ......... G06F 17/2288
CN 109885576 A * 6/2019
(Continued)

OTHER PUBLICATIONS

KR_20070060087_A_Information Processing Device, Information Recording Medium, Contents Management System, Data Processing Method, and Computer Program; (pp. 27) by Ueda Kenjiro; Oishi Tateo; Osawa Yoshitomo; Muramatsu Katsumi; Kato Motoki and Takashima Yoshikazu; Date Published: Jun. 12 (Year: 2007).*
(Continued)

*Primary Examiner* — Eleni A Shiferaw
*Assistant Examiner* — Ali H. Cheema
(74) *Attorney, Agent, or Firm* — NIXON & VANDERHYE P.C.

(57) ABSTRACT

To protect the integrity of data stored in a protected area of memory, data in the protected area of memory is retrieved in data blocks and an authentication code is associated with a memory granule contiguously comprising a first data block and a second data block. Calculation of the authentication code comprises a cryptographic calculation based on a first hash value determined from the first data block and a second hash value determined from the second data block. A hash value cache is provided to store hash values determined from data blocks retrieved from the protected area of the memory. When the first data block and its associated authentication code are retrieved from memory, a lookup for the second hash value in the hash value cache is performed, and a verification authentication code is calculated for the
(Continued)

memory granule to which that data block belongs. The integrity of the first data block is contingent on the verification authentication code matching the retrieved authentication code.

17 Claims, 9 Drawing Sheets

(51) Int. Cl.
    *G06F 21/64*     (2013.01)
    *H04W 12/06*     (2021.01)
    *G06F 12/0875*     (2016.01)
    *G06F 12/14*     (2006.01)
    *G06F 21/79*     (2013.01)

(52) U.S. Cl.
    CPC ...... *G06F 12/0875* (2013.01); *G06F 12/1408* (2013.01); *G06F 21/79* (2013.01)

(58) Field of Classification Search
    CPC ......... G06F 2212/1052; G06F 12/0875; G06F 12/1408; G06F 21/79; G06F 2221/21; G06F 21/6272; H04W 12/06
    USPC .......................................................... 713/189
    See application file for complete search history.

(56) References Cited

U.S. PATENT DOCUMENTS

| | | | | |
|---|---|---|---|---|
| 7,680,998 | B1 * | 3/2010 | Auchmoody | G06F 11/1464 707/648 |
| 8,065,277 | B1 * | 11/2011 | Gardner | G06F 16/907 707/673 |
| 8,095,803 | B1 * | 1/2012 | Carter | G06F 21/6245 713/181 |
| 8,184,811 | B1 * | 5/2012 | Patten | H04W 12/10 380/247 |
| 8,261,085 | B1 * | 9/2012 | Fernandez Gutierrez | G06F 21/565 711/119 |
| 8,621,240 | B1 * | 12/2013 | Auchmoody | G06F 21/6272 713/193 |
| 8,825,971 | B1 * | 9/2014 | Auchmoody | G06F 11/1453 711/162 |
| 8,826,023 | B1 * | 9/2014 | Harmer | G06F 21/6227 711/158 |
| 10,353,818 | B1 * | 7/2019 | Auchmoody | G06F 11/1451 |
| 10,728,035 | B1 * | 7/2020 | Shoikhet | G06F 21/64 |
| 11,514,001 | B2 * | 11/2022 | Bassov | G06F 16/1744 |
| 2001/0034839 | A1 * | 10/2001 | Karjoth | H04L 9/3236 713/176 |
| 2004/0190526 | A1 * | 9/2004 | Kumar | H04L 45/302 370/395.32 |
| 2005/0071436 | A1 * | 3/2005 | Hsu | G06F 11/008 709/212 |
| 2010/0153732 | A1 * | 6/2010 | Su | H04L 9/3247 713/176 |
| 2010/0281216 | A1 * | 11/2010 | Patel | G06F 12/121 711/E12.017 |
| 2011/0178996 | A1 * | 7/2011 | Pendlebury | G06F 11/1453 707/E17.005 |
| 2012/0179656 | A1 * | 7/2012 | Bunte | G06F 21/6218 707/673 |
| 2014/0304464 | A1 * | 10/2014 | Bert | G06F 3/0688 711/105 |
| 2015/0019816 | A1 * | 1/2015 | Akirav | G06F 12/0875 711/129 |
| 2015/0019817 | A1 * | 1/2015 | Akirav | G06F 3/0641 711/129 |
| 2015/0363594 | A1 * | 12/2015 | Hunacek | G06F 21/64 726/22 |
| 2016/0292168 | A1 * | 10/2016 | Ramesh | G06F 16/137 |
| 2017/0091107 | A1 * | 3/2017 | Peterson | G06F 12/084 |
| 2017/0235496 | A1 * | 8/2017 | Brosch | G06F 3/0641 707/692 |
| 2018/0075255 | A1 * | 3/2018 | Lynch | H04W 12/033 |
| 2018/0196609 | A1 * | 7/2018 | Niesen | G06F 3/0641 |
| 2019/0073152 | A1 * | 3/2019 | Nagle | G06F 3/067 |
| 2019/0303160 | A1 * | 10/2019 | Greenhalgh | G06F 9/3806 |
| 2020/0341668 | A1 * | 10/2020 | Gonczi | G06F 3/0688 |
| 2020/0389521 | A1 * | 12/2020 | Brock | H04L 9/50 |
| 2021/0286768 | A1 * | 9/2021 | Kucherov | G06F 12/0811 |

FOREIGN PATENT DOCUMENTS

| | | | | |
|---|---|---|---|---|
| CN | 110019052 | A * | 7/2019 | .......... G06F 3/0641 |
| EP | 1010080 | B1 * | 3/2011 | .......... G06F 12/123 |
| EP | 2 446 388 | | 5/2012 | |
| EP | 2 955 660 | | 12/2015 | |
| JP | 2011501321 | A * | 1/2011 | .......... G06F 9/4401 |
| KR | 20070060087 | A * | 6/2007 | .......... H04L 9/3236 |
| WO | WO-2006065050 | A1 * | 6/2006 | ............. G06F 21/10 |
| WO | 2010/149333 | | 12/2010 | |
| WO | WO-2010149333 | A1 * | 12/2010 | ......... G06F 12/1408 |

OTHER PUBLICATIONS

CN_110019052_A_ Method And Storage System For Distributed Repeating Data Deleting (Machine Translation) by Chen, Wen-xian and Xie, Wen-jie; (pp. 8) Date Published: Jul. 16 (Year: 2019).*
International Search Report and Written Opinion of the International Searching Authority for PCT/GB2021/051733 dated Oct. 13, 2021, 13 pages.

* cited by examiner

| 268 | 264 | 266 | 262 | |
|---|---|---|---|---|
| PRIORITY | VALIDITY | DIRTY? | DATA | 260 |
| | | | | |
| | | | | |
| | | | | |
| | | | | |
| | | | | |
| | | | | |
| | | | | |

MEMORY PROTECTION USING CACHED PARTIAL HASH VALUES

TECHNICAL FIELD

The present disclosure relates to data processing. In particular, the present disclosure relates to memory security.

DESCRIPTION

It may be required for a data processing system to process data which is in need of protection, that is to say should not be available to unauthorised parties. However, the quantity of such data which must be processed may be greater than can be securely stored within a trusted processing device, so that it must be stored in a memory to which it cannot be guaranteed that an attacker does not have access. For this reason it is known for such data to be stored with an associated authentication code, generated within the trusted processing device using cryptography techniques on the basis of the data, such that when the data and the authentication code are retrieved from the memory the data and the authentication code can be examined. In particular a regeneration of the authentication code can be carried out (based on a secret key as part of the cryptography technique) to see if this matches the retrieved authentication code. The integrity of the retrieved data is then confirmed if the authentication codes match, indicating that the data has not been modified since the authentication code was generated and stored. Handling authentication codes in addition to the data to be processed itself is an overhead which may for example be 12.5% in the case of 64-bit authentication codes protecting 64-byte blocks of data. In principle the authentication code could protect a larger block of data, but this can complicate the operation of the memory system if the data blocks become larger than the normal unit of data which forms the basis of memory transactions.

SUMMARY

In one example embodiment described herein there is an apparatus comprising: memory protection circuitry to verify integrity of memory granules in a protected area of a memory; and a hash value cache to store hash values determined from data blocks retrieved from the protected area of the memory, wherein: when retrieval from the memory of a first data block and an authentication code associated with a memory granule contiguously comprising the first data block and a second data block occurs, the memory protection circuitry is responsive to the retrieval to calculate a verification authentication code for the memory granule, wherein integrity of the first data block is contingent on the verification authentication code matching the authentication code, wherein calculation of the verification authentication code comprises a cryptographic calculation based on a first hash value determined from the first data block and a second hash value determined from the second data block, and the memory protection circuitry is arranged to lookup the second hash value in the hash value cache when the calculation of the verification authentication code is required.

In a further example embodiment described herein there is a method of verifying integrity of memory granules in a protected area of a memory, comprising: storing in a hash value cache hash values determined from data blocks retrieved from the protected area of the memory; calculating, when retrieval from the memory of a first data block and an authentication code associated with a memory granule contiguously comprising the first data block and a second data block occurs, a verification authentication code for the memory granule, wherein integrity of the first data block is contingent on the verification authentication code matching the authentication code, wherein calculating the verification authentication code comprises a cryptographic calculation based on a first hash value determined from the first data block and a second hash value determined from the second data block; and looking-up the second hash value in the hash value cache when the calculation of the verification authentication code is required.

In a further example embodiment described herein there is an apparatus comprising means for verifying integrity of memory granules in a protected area of a memory; means for caching hash values determined from data blocks retrieved from the protected area of the memory; means for calculating, when retrieval from the memory of a first data block and an authentication code associated with a memory granule contiguously comprising the first data block and a second data block occurs, a verification authentication code for the memory granule, wherein integrity of the first data block is contingent on the verification authentication code matching the authentication code, wherein the means for calculating the verification authentication code comprises means for performing a cryptographic calculation based on a first hash value determined from the first data block and a second hash value determined from the second data block; and means for looking-up the second hash value in the means for caching hash values when the calculation of the verification authentication code is required.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
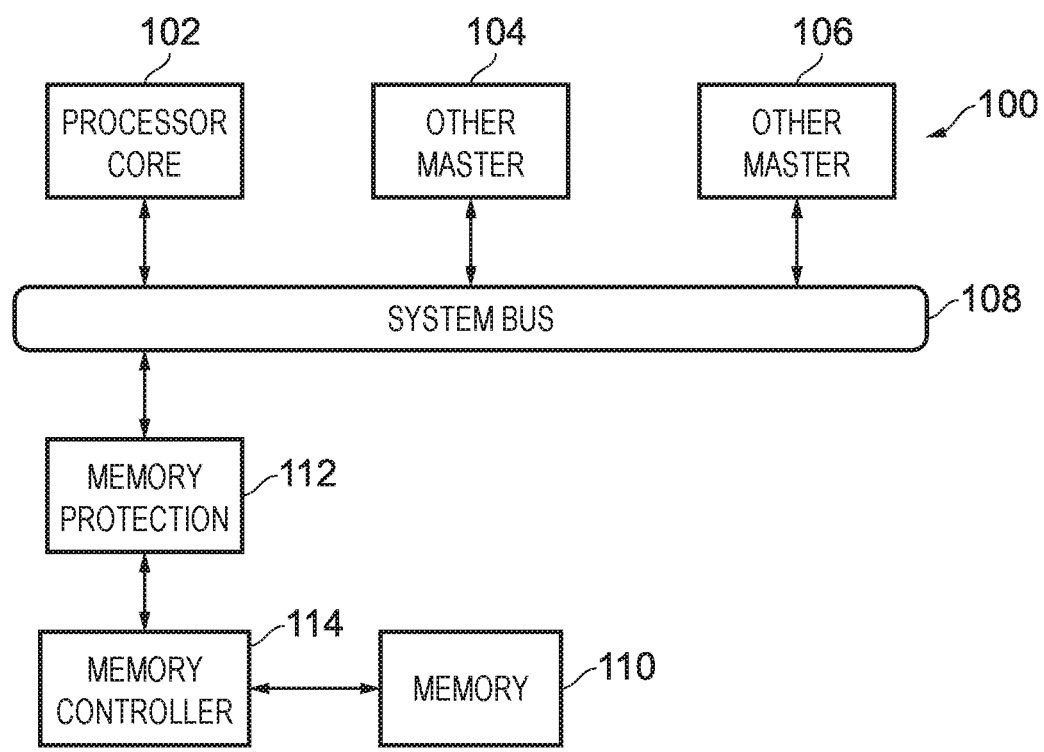
FIG. 1 schematically illustrates a data processing system in which memory protection circuitry according to some embodiments may be implemented to verify the integrity of the data stored in a memory.

Before discussing the embodiments with reference to the accompanying figures, the following description of embodiments is provided.

In accordance with one example configuration there is provided an apparatus comprising: memory protection circuitry to verify integrity of memory granules in a protected area of a memory; and a hash value cache to store hash values determined from data blocks retrieved from the protected area of the memory, wherein: when retrieval from the memory of a first data block and an authentication code associated with a memory granule contiguously comprising the first data block and a second data block occurs, the memory protection circuitry is responsive to the retrieval to calculate a verification authentication code for the memory granule, wherein integrity of the first data block is contingent on the verification authentication code matching the authentication code, wherein calculation of the verification authentication code comprises a cryptographic calculation based on a first hash value determined from the first data block and a second hash value determined from the second data block, and the memory protection circuitry is arranged to lookup the second hash value in the hash value cache when the calculation of the verification authentication code is required.

In a data processing system in which data is retrieved from memory in blocks, i.e. in units of data which are larger than the smallest addressable data item size used in the system, a standard approach to the use of associated authentication codes to protect the integrity of the data is to associate an authentication code with each block. For example in the case of a data processing system arranged to retrieve data from memory in 64-byte blocks, a 64-bit authentication code may be associated with the 64 byte block. However the present techniques take a novel approach to the protection of such data, according to which an authentication code is associated with a memory granule which contiguously comprises (at least) two data blocks, where a "data block" here is taken to mean the unit of data which the apparatus is arranged to retrieve from memory. Thus when a specific data item is required to be retrieved from memory, the data block of which that specific data item only forms part is retrieved as a whole. The data block is associated with at least one further data block, together forming a "memory granule" in the terminology used herein. Further, an authentication code which protects that specific data item is determined on the basis of the memory granule, i.e. not just on the basis of the data block to which the specific data item belongs. The determination of the authentication value comprises a cryptographic calculation which is based on a first hash value determined from the first data block and a second hash value determined from the second data block. This approach is based on the realisation that an authentication code can be constructed, the computation of which can be split. That is to say, generally where AC(DB1, DB2) represents the authentication code of data blocks DB1 and DB2, AC(DB1, DB2) can be constructed as f(AC'(DB1),AC'(DB2)). The apparatus further comprises a hash value cache for storing such hash values (where the function AC' is in this case a hash function). This arrangement means that when a first data item and an associated authentication code are retrieved from memory, and when the second hash value data item is present in hash value cache, the authenticity of the first data item can be verified by making use of the second hash value, without needing to also retrieve the second data item from memory. In this manner the storage size ratio of the authentication codes to the data they protect is reduced, without requiring that an additional data block needs to be retrieved from memory when a single data block is retrieved.

The cryptographic calculation according to which the authentication codes are determined may take a variety of forms, but in some embodiments it comprises a linear combination of the first hash value and the second hash value in a finite field defined by a set of all possible values which can be represented by the apparatus for each of the first hash value and the second hash value. Constraining the calculation in this manner facilitates its implementation in a data processing apparatus, aligning the calculation of the authentication code and the representation of the authentication code with the representation used for the first hash value and the second hash value. For example, when each hash value is represented by a 64-bit data value, the authentication code can also be represented by a 64-bit data value, with the linear combination of hash values taking place within the finite field defined by the set of all possible values of a 64-bit value. There is then also no need for truncation of a calculated value. Further, when the authentication code is also encrypted, the avoidance of subsequent truncation means that the encrypted value can be decrypted.

The linear combination may be variously defined but in some embodiments comprises multiplying at least one of the first hash value and the second hash value by a constant. In some embodiments the linear combination comprises multiplying the first hash value by a first constant and multiplying the second hash value by a second constant.

One or more constants employed in the linear combination may take a variety of forms, but in some embodiments the constant is a secret key value. In some embodiments the first constant is a first secret key value and the second constant is a second secret key value.

In some embodiments the apparatus further comprises a data block cache to store copies of data blocks retrieved from the memory and wherein the copies of data blocks are cache lines of the data block cache. A cache-line size based approach to the retrieval of data from memory may therefore be employed, with each authentication code thus being associated with two (or more) cache lines.

The present techniques further recognise that in an apparatus which comprises both the data block cache and the hash value cache, there are a great variety of ways in which control over the respective content of each can be made, and further that a coordination control can be made use of to improve the data processing efficiency of an apparatus operating according to the present techniques. Accordingly in some embodiments the apparatus further comprises cache content coordination control circuitry to control storage in the data block cache and the hash value cache, wherein storage in the data block cache is dependent on content of the hash value cache, and wherein storage in the hash value cache is dependent on content of the data block cache. This mutual dependency of the content of each cache on the content of the other cache can be implemented in a variety of ways.

In some embodiments the cache content coordination control circuitry is arranged to impose an exclusive storage policy on the data block cache and the hash value cache, such that for a data block and an associated hash value exclusively either the data block is stored in the data block cache or the associated hash value is stored in the hash value cache. Since a given hash value is generated from the corresponding data block, when a given data block is currently stored in the data block cache there is strictly speaking no need for the corresponding hash value to be stored in the hash value cache, since it can be recreated from the cached data block. Conversely when a given hash value is currently stored in the hash value cache, the primary purpose of this cached hash value may be to enable another data item within the memory granule to be authenticated. Accordingly, when the data item from which this cached hash value derived is not currently required for the data processing purposes of the apparatus, there is no need for it to be held in the data cache, merely for authentication verification purposes. Improved usage of the finite storage space in each of the caches can thus be brought about.

The cache content coordination control circuitry can administer a wide variety of policies with regard to the content of the hash value cache and the data block cache. In some embodiments the cache content coordination control circuitry is arranged to administer a victim selection policy for the data block cache, in which: a likelihood of selection of a victim data block is increased when, for a further data block contiguously forming a memory granule with the victim data block, a hash value determined from the further data block is presently stored in the hash value cache. Victim selection policies (more generally, cache replacement policies) may be implemented in a great variety of ways in dependence on a range of factors, such as one or more of when a cache line was allocated, how recently a cache line was last used, how (in)frequently a cache line is being used, the owning process which caused the cache line to be allocated, and so on. The likelihood of selection of a given cache line for eviction can accordingly be adjusted in a variety of ways, for example by the association of a priority value with each cache line, where a cache line is less likely to be evicted the higher the priority value associated with it.

The present techniques make use of this ability to influence cache line eviction likelihood in each of the hash value cache and the data block cache, making use of an awareness of the relative usefulness of the presence of a given cache line in one of the caches depending on the current content of the other cache. Hence for example, for a given data block pair {L, L'} having corresponding hash values {H,H'}, when L is currently cached in the data value cache it can be made more likely to be selected for eviction (e.g. by lowering a priority value associated with it), when H' is currently stored in the hash value cache. There may be various circumstances when this approach is used, for example, when L is dirty (i.e. modified), holding H' in the hash value cache allows for faster eviction of L later, since this will require a recalculation of the authentication code (based on H and H') to also be stored to memory when the modified L is written to memory.

In some embodiments the cache content coordination control circuitry is arranged to administer a victim selection policy for the data block cache, in which: prior to an eviction from the data block cache being required, a victim data block is selected; and for a further data block contiguously forming a memory granule with the victim data block, a hash value determined from the further data block is caused to be stored in the hash value cache. Accordingly, again using the example of a data block pair {L, L'} having corresponding hash values {H,H'}, when L is selected as the victim data block, H' is caused to be stored in the hash value cache.

In order to administer its control over the hash value cache and the data value cache and in particular the respective victim selection policies in each, the cache content coordination control circuitry may make further use of information indicative of the usage of the respective cache lines. For example in some embodiments the apparatus further comprises data block usage storage to store usage indications for the data blocks, and wherein the cache content coordination control circuitry is arranged to administer a victim selection policy for the data block cache, in which: a likelihood of selection of a victim data block is decreased when, for a further data block contiguously forming a memory granule with the victim data block, the usage indications show usage of the further data block above a predetermined threshold. Thus for the data block pair {L, L'} having corresponding hash values {H,H'}, the likelihood of L being selected as the victim data block is decreased when L' has recently been used and is therefore more likely to be used again in the near future.

In some embodiments the apparatus further comprises data block usage storage to store usage indications for the data blocks, and wherein the cache content coordination control circuitry is arranged to administer a victim selection policy for the hash value cache, in which: a likelihood of selection of a victim hash value is decreased when, for a further data block contiguously forming a memory granule with a data block from which the victim hash value is determined, the usage indications show usage of the further data block above a predetermined threshold. Thus for the data block pair {L, L'} having corresponding hash values {H,H'}, the likelihood of H being selected as the victim hash value block is decreased, when L' has recently been used and is therefore more likely to be used again in the near future. In some such embodiments the victim hash value is clean and the usage of the further data block is reading of the further data block. This is based on the recognition that holding L and H (in a clean state), it is beneficial if L' is likely to be read again soon.

In some embodiments the apparatus further comprises data block usage storage to store usage indications for the data blocks, and wherein the cache content coordination control circuitry is arranged to administer a victim selection policy for the hash value cache, in which: a likelihood of selection of a victim hash value is decreased when the victim hash value is dirty and the usage indications show usage of the data block above a predetermined threshold and the usage of the data block is writing to the data block. Thus for the data block pair {L, L'} having corresponding hash values {H,H'}, the likelihood of H being selected as the victim hash value block is decreased, when L has recently been used and written to, and is therefore more likely to be written to again in the near future. In some such embodiments the victim hash value is clean and the usage of the further data block is reading of the further data block. This is based on the recognition that holding L and H (in a clean state) is beneficial if L' is likely to be read again soon.

In some embodiments the cache content coordination control circuitry is responsive to a read access to a data block in the data block cache to trigger a look-up for a corresponding hash value in the hash value cache. Thus when a read access to L is made, a lookup for H in the hash value cache is carried out.

In some embodiments the cache content coordination control circuitry is responsive to a write access to a data block in the data block cache to trigger a look-up in the hash value cache for a further hash value determined from a further data block contiguously forming a memory granule with the data block. Thus when L is written to, a lookup for H' in the hash value cache is carried out. This means that when the modified L is subsequently evicted, and the authentication code based on H and H' needs to be calculated can happen faster, if H' is present in the hash value cache.

Conversely in some embodiments when a read access to a data block in the data block cache triggers a look-up for a corresponding hash value in the hash value cache, when the look-up for the corresponding hash value results in a miss in the hash value cache, allocation of the hash value into the hash value cache is suppressed. This is because modification of L will mean that H will need recalculating.

The calculation of the authentication codes needs to be secure, such that untrusted parties cannot modify a data item and calculate a corresponding authentication code to substitute, such that the modified data item would be verified as authentic. Nevertheless in some embodiments the apparatus further comprises encrypted storage for hash values, wherein the cryptographic calculation is a linear combination of an encrypted first hash value determined from the first data block and an encrypted second hash value determined from the second data block, wherein the encrypted first hash value and the encrypted second hash value are retrieved from the encrypted storage for hash values. Thus, when the hash values themselves are secure, by virtue of being stored in encrypted form, the calculation of the authentication code which combines them does not itself need to be secure, and may be a simple linear combination of the type H+gH', where g is an arbitrary constant (which could, without loss of generality, be 1).

In accordance with one example configuration there is provided a method of verifying integrity of memory granules in a protected area of a memory, comprising: storing in a hash value cache hash values determined from data blocks retrieved from the protected area of the memory; calculating, when retrieval from the memory of a first data block and an authentication code associated with a memory granule contiguously comprising the first data block and a second data block occurs, a verification authentication code for the memory granule, wherein integrity of the first data block is contingent on the verification authentication code matching the authentication code, wherein calculating the verification authentication code comprises a cryptographic calculation based on a first hash value determined from the first data block and a second hash value determined from the second data block; and looking-up the second hash value in the hash value cache when the calculation of the verification authentication code is required.

Particular embodiments will now be described with reference to the figures.

FIG. 1 illustrates a data processing system 100 in accordance with some embodiments. The system comprises a processor core 102 and two further master devices 104, 106. Each of these devices makes access to data stored in a memory 110, which they access via a system bus 108. Access to the memory 110 is generally controlled by the memory controller 114, but in addition accesses to the memory must pass via memory protection apparatus 112. At least some data items stored in the memory 110 have an associated authentication code, such that the integrity of a given data item can be verified with reference to its associated authentication code. The memory protection apparatus 113 is arranged to calculate and verify the authentication codes.

Figure 2:
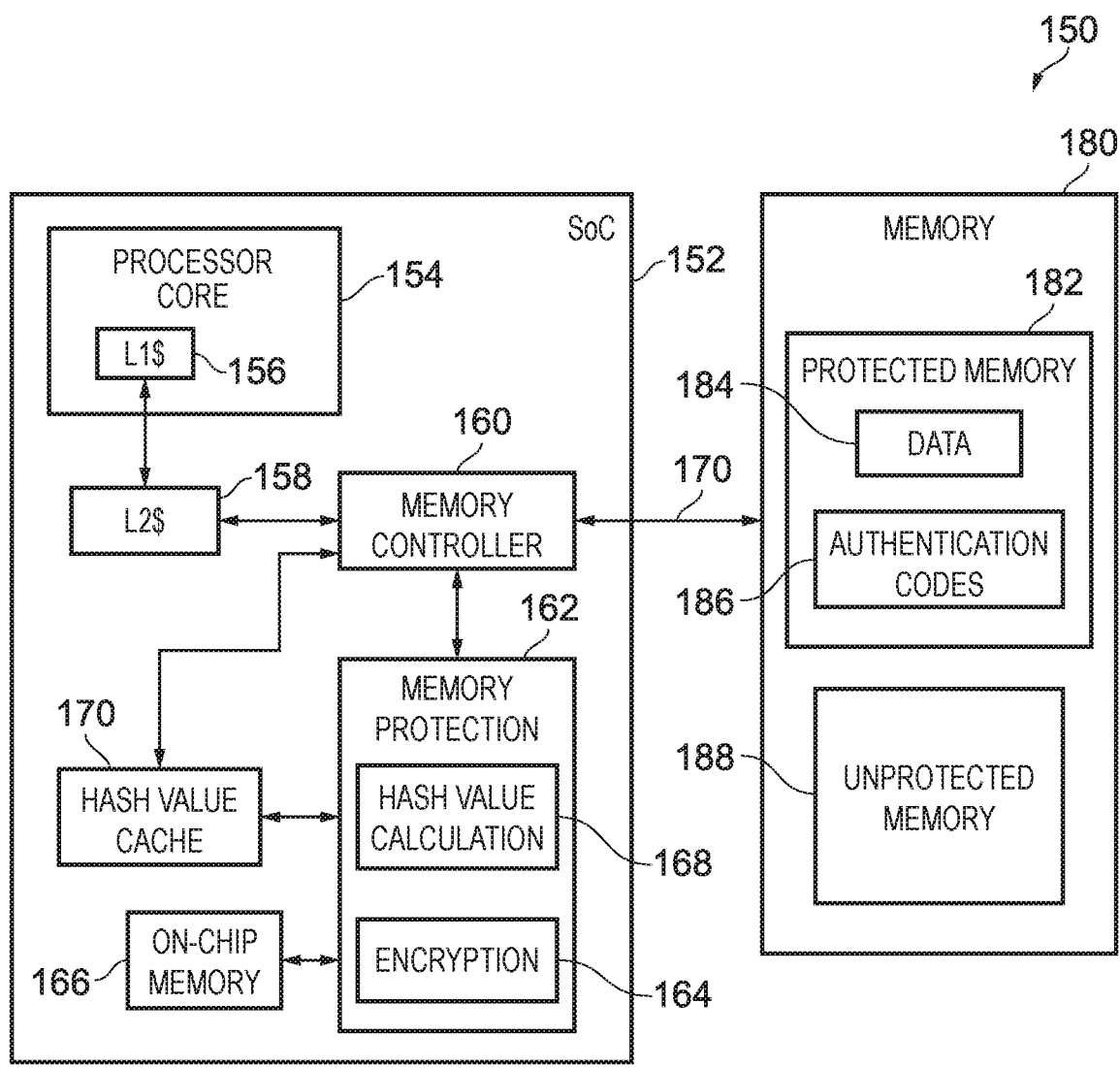
FIG. 2 schematically illustrates a system-on-chip comprising memory protection circuitry according to some embodiments where the system-on-chip makes access to an off-chip memory in which data is stored.

FIG. 2 schematically illustrates an example data processing system 150, which comprises an integrated circuit or system-on-chip 152, which includes at least one processor core 154 for executing program instructions to carry out data processing operations. While FIG. 2 only shows one processor core, in some cases the system-on-chip 152 may comprise multiple processors. Each processor core or processor core cluster may have a cache 156 (or multiple levels of cache 156, 158). A memory controller 160 acts as memory access circuitry for controlling access to an off-chip memory 180, which is on a separate integrated circuit from the system-on-chip 152. While accesses to data on-chip may be difficult for an attacker to tamper with, data passing beyond the edge boundary of the chip may be vulnerable to attack. This could for example involve interception of data on the physical channel 170, via which the memory controller 160 communicates with the off-chip memory 180, or it might be by reading or modifying the data while it is stored in the off-chip memory 180. While the above example is described in terms where the trust boundary corresponds to the edge of the system-on-chip, in other cases there could be a trust boundary within the system-on-chip itself, where data beyond the trust boundary might be exposed to potential attacks.

The system-on-chip 152 further comprises a memory protection unit 162, which is provided for protecting data stored to a protected memory region 182 of the off-chip memory 180. Since the off-chip memory 180 is beyond the trust boundary, this protection is necessary, since a malicious agent who has physical access to the system could observe and/or replay the data values being exchanged between the processor core 154 and the off-chip memory 180. The protected memory region 182 includes the data 184 to be protected, as well as authentication codes 186 used to verify the integrity of the data 184. An unprotected memory region 188 is also provided in the off-chip memory 180 and data stored in this unprotected region are not protected by the memory security protection unit 162 and thus could be accessed and modified by an attacker. In some implementations the mapping of addresses to the protected and unprotected memory regions 182, 188 may be fixed by the hardware, so that it is not possible for an operating system or other software executed by the processor core 154 to vary which addresses are mapped to the protected memory region 182 and the unprotected memory region 188. Alternatively, if the operating system controlling the address mapping can be trusted, the address mapping controlling which addresses are mapped to the protected region and the unprotected region may be varied by the processor under the control of the software, such that the protected and unprotected regions need not always mapped to the same physical locations in the off-chip memory 180. In some implementations there may not be an unprotected memory region 188 provided in the off-chip memory 180 and in such a case the entire off chip memory could be considered to be the protected memory region 182.

The memory protection unit 162 includes encryption/decryption circuitry 164 for encrypting data being written to the off-chip memory 180 and decrypting encrypted data read from the off-chip memory. Encryption keys used by the encryption and decryption may be stored within an on-chip memory (e.g. SRAM) 166 on the system-on-chip 152 or within the memory protection unit 162 itself. Any known technique may be used for the encryption and decryption and any known approach to protecting the encryption keys can be used. The memory protection unit 162 also includes hash value calculation circuitry 168, which calculates hash values for data items. The hash value calculation circuitry 168 and the encryption unit 164 together calculate the above-mentioned authentication codes associated with the data items stored in the protected memory 182. Calculation of the authentication codes is described in more detail below.

Figure 3A:
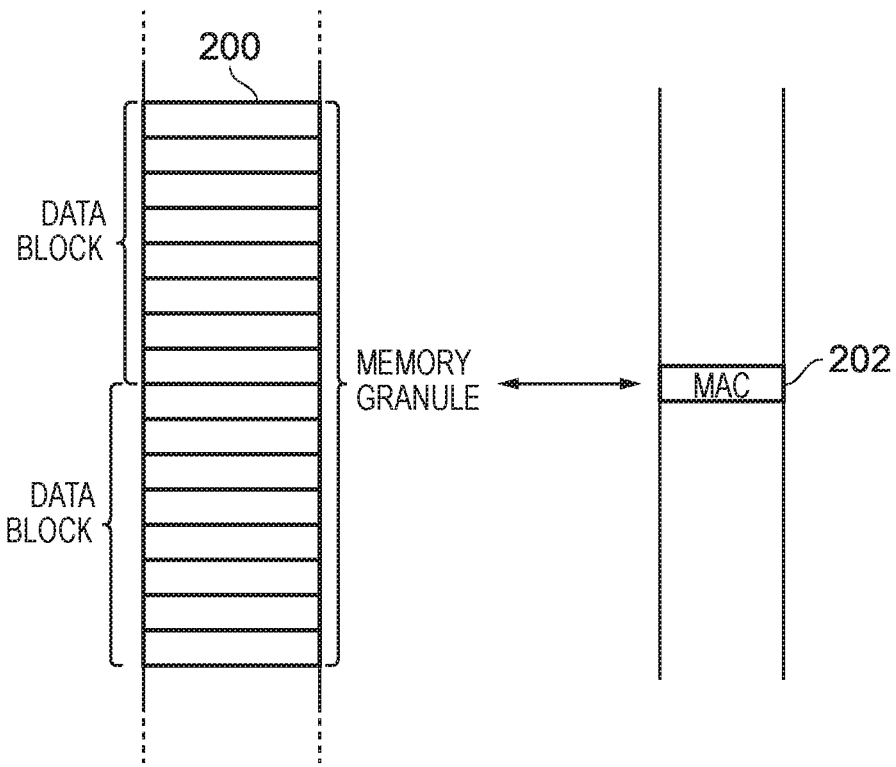
FIG. 3A schematically illustrates a memory granule forming a portion of memory space, which is comprised of two data blocks, and an associated authentication code.

FIG. 3A schematically illustrates two sections of addressable memory. In a first section (physically located in the data portion 184 of the protected memory 182), sixteen consecutive memory addresses 200 are shown, each comprising storage for a 64-bit data item, and where eight 64-bit data items together form a first 512-bit data block and eight 64-bit data items together form a second 512-bit data block. Together the two data blocks form a 1024-bit memory granule. In a second section (physically located in the authentication codes portion 186 of the protected memory 182) a 64-bit authentication code (MAC) 202 corresponding to the illustrated 1024-bit memory granule is shown. These specific data item, data block, memory granule, and authentication code sizes are given here for illustrative purposes only, and may be arbitrarily varied in different implementations.

Figure 3B:
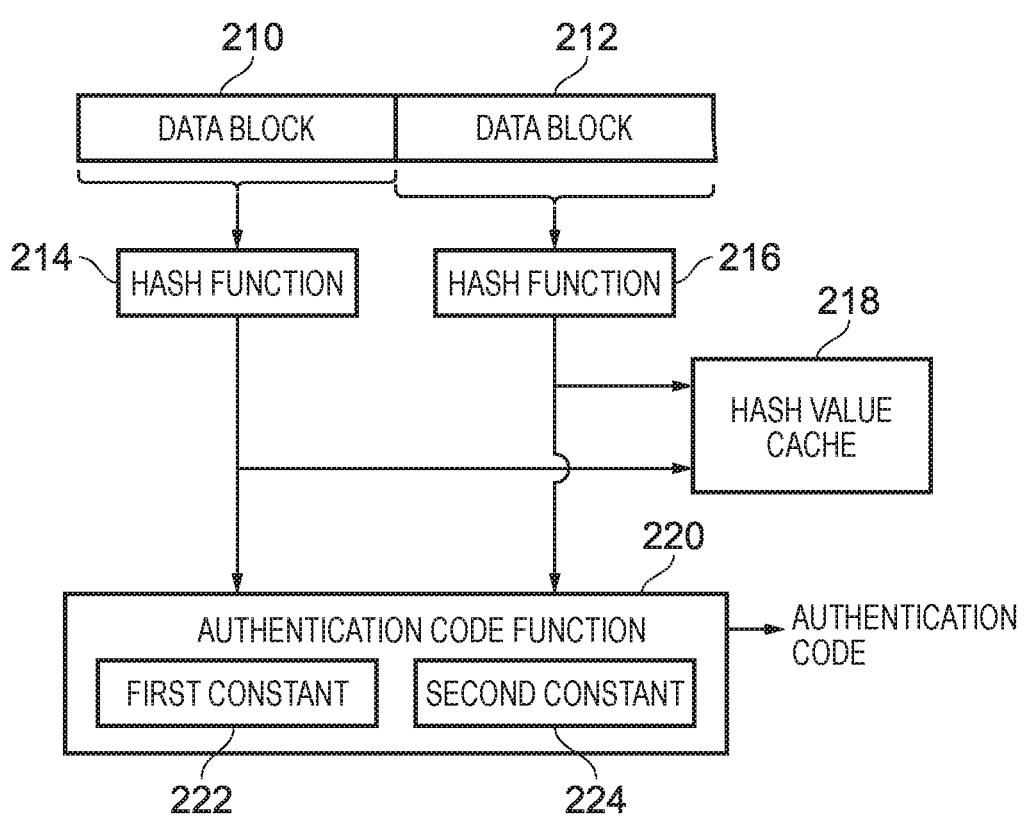
FIG. 3B schematically illustrates the generation of an authentication code on the basis of hash functions applied to two data blocks.

FIG. 3B schematically illustrates the generation of an authentication code on the basis of hash functions applied to two data blocks. It is to be noted that in some implementations each authentication code may be generated on the basis of more than two data blocks, however for clarity of illustration an example is taken here with an authentication code protecting two data blocks. The underlying principle of the present techniques is firstly set out as follows:

Let L, L' be two 512-bit data blocks, where L|L' is a 128-byte aligned memory granule;
then $L=b_0\|b_1\| \ldots b_7$ where the $b_i$ are eight 64-bit data items, and
then $L'=b'_0\|b'_1 \ldots b'_7$ where the $b'_i$ are eight 64-bit data items.

A multilinear hash can then be used to calculate hashes from each of these as:

$$H=\alpha_0 \cdot b_0 + \alpha_1 \cdot b_1 + \ldots + \alpha_7 \cdot b_7$$

$$H'=\alpha_0 \cdot b'_0 + \alpha_1 \cdot b'_1 + \ldots + \alpha_7 \cdot b'_7$$

Finally an authentication code (MAC) of L||L' can then be calculated as a linear combination of H and H', which is then encrypted:

$$MAC(L,L')=\text{encrypt}(H+\gamma \cdot H')$$

An authentication code thus calculated may further be truncated, although the cryptographic calculation may also be constrained to combine the H and H' within the bit space (e.g. a 64-bit space) available for representation of the first and second hash values. In another example the linear combination of the hash values may employ a constant factor for both:

$$MAC(L,L')=\text{encrypt}(\delta \cdot H + \gamma \cdot H')$$

Either or both of the factors $\delta$ and $\gamma$ may be secret key values, which may be the same or may differ. Thus in the example embodiment shown in FIG. 3B, first and second data blocks 210, 212 provide the respective inputs to hash functions 214, 216. These hash functions are in fact the same as one another, parallelized in this implementation. Either or both of the respective first and second hash values thus generated can then be cached in the hash value cache 218, whilst both form the inputs to authentication code function circuitry 220, which calculates an authentication value (MAC) as set out above. In doing so first and/or second constants 222, 224 (factors $\delta$ and $\gamma$) may be employed as described above, either or both of which may be secret key values. Note that in some implementations, the authentication code storage 186 is encrypted in the protected memory, and this has the consequence that the determination of the authentication code (the combination of the hashes H and H') can be just an operation of the type $\delta \cdot H + \gamma \cdot H'$, i.e. without the need encrypt it.

Figures 4A, 4B:
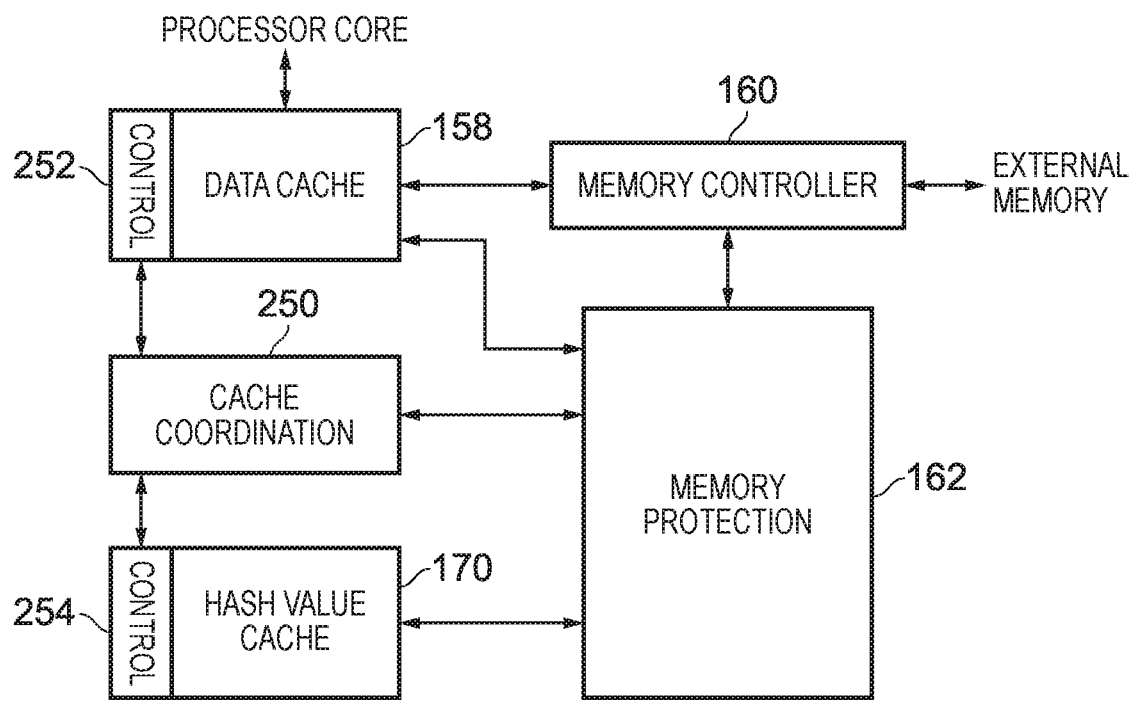
FIG. 4A schematically illustrates apparatus comprising memory protection circuitry in some embodiments in which cache coordination circuitry is provided to coordinate the control of a data cache and a hash value cache.
FIG. 4B schematically illustrates some details of entries in a cache in some embodiments.

FIG. 4A schematically illustrates components forming part of an apparatus such as the system-on-chip 152 shown in FIG. 2. The data cache 158, the memory controller 160, the memory protection unit 162, and the hash value cache 170 are configured and operated as described above with respect to FIG. 2, and that description is not repeated here for conciseness. The hash value cache 170 is also referred to herein as a "partial hash cache", because of the manner in which two hash values combine to form an authentication code. FIG. 4A additionally shows cache coordination circuitry 250, which is provided to coordinate the control of the data cache 158 and the hash value cache 170. In particular the cache coordination circuitry 250 interacts with the cache control circuitry 252 associated with the data cache 158 and interacts with the cache control circuitry 254 associated with the hash value cache 170. This cache coordination circuitry 250 thus enables policies regarding the content of each of the caches 158, 170 to be administered, taking into account the current status and content of the other cache. To take just one example, the cache coordination circuitry may impose a policy that the data cache 158 is exclusive with the hash value cache 170, in the sense that either a cache line is in data cache 158 or its partial hash is in the partial hash cache (but not both). This can be beneficial, since computing, for instance, multilinear hashes is very efficient and this approach can further reduce the pressure on the caches, albeit with some possible minor additional latency and power consumption.

FIG. 4B schematically illustrates some details of entries in a cache (which may represent either a data cache or a hash value cache), where each cache line 260 not only holds data (e.g. a set of eight 64-bit data items in the example of a 512-bit cache line), but also has further metadata associated with the cache line, which in the example of FIG. 4B are a validity bit 264, a dirty bit 266, and a priority value 268. These items of metadata are used by the cache control circuitry 252, 254, coordinated by the cache coordination circuitry 250, in order to determine what content to keep in each cache (and conversely which cache lines to select for eviction).

Figure 5:
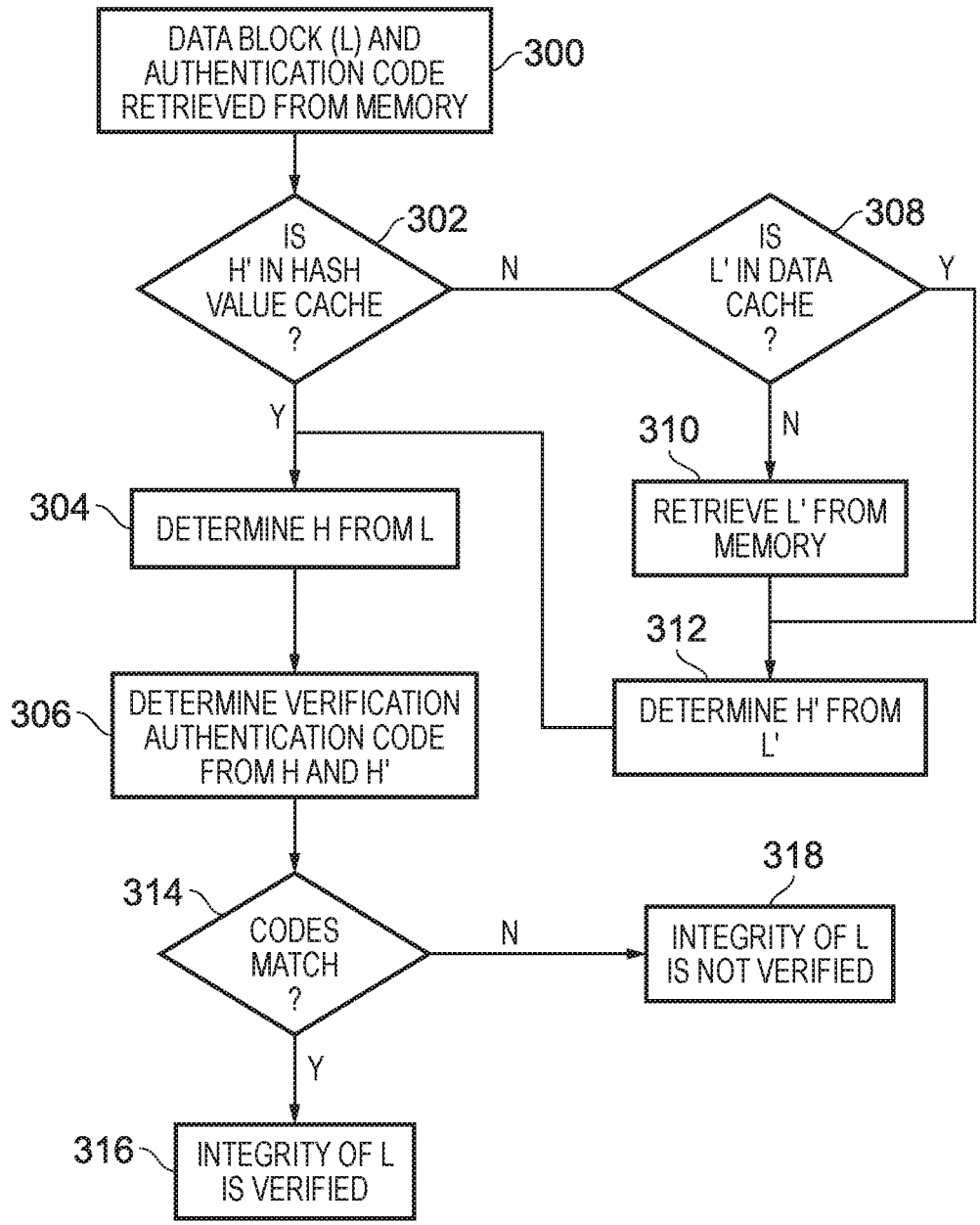
FIG. 5 is a flow diagram showing a sequence of steps according to which the integrity of a data block is verified in some embodiments.

FIG. 5 is a flow diagram showing a sequence of steps according to which the integrity of a data block L is verified in some embodiments. The flow begins at step 300, where a data block L and its associated authentication code are retrieved from memory. Then at 302 it is determined if the hash value H' derived from the data block L' with which L is paired (i.e. together they form a memory granule) is present in the hash value cache. If this cache lookup results in a hit (i.e. H' is present in the hash value cache), the flow proceeds to step 304, where the hash value H is derived from the data block L. Then at step 306 a verification authentication code is calculated from the partial hashes H and H'. Returning to a consideration of step 302, if H' is not present in the hash value cache the flow proceeds to step 308, where it is determined if L' is present in the data cache. If this look up misses then the flow proceeds via 310 at which L' is retrieved from memory. Then at step 312 the hash value H' is derived from the data block L' and the flow re-joins at step 304. At step 314 it is determined if the authentication codes match, i.e. if the authentication code associated with data block L retrieved from memory at step 300 is identical to the verification authentication code calculated at step 306. If they match then the flow proceeds to step 316 and the integrity of L is verified. If they do not match then the flow proceeds to step 318 and the integrity of L is not verified, i.e. it appears that either or both of data block L and its authentication code (or data block L' if the path via step 310 was taken) has been tampered with.

Figure 6:
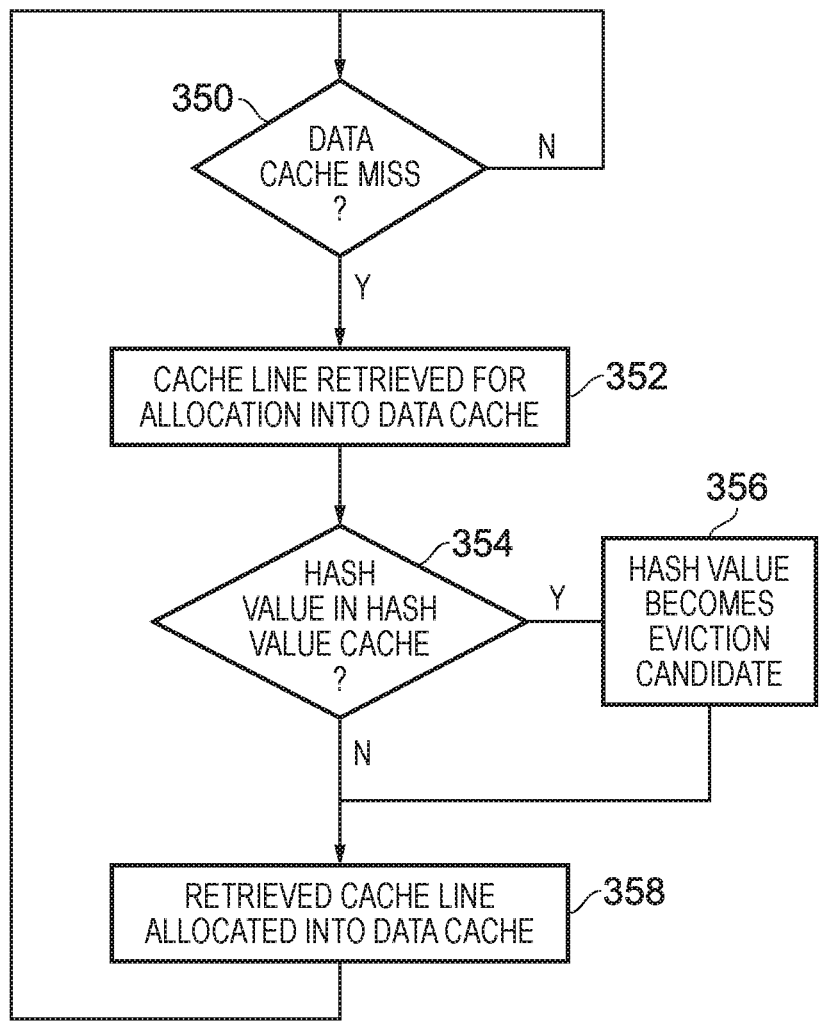
FIG. 6 is a flow diagram showing a sequence of steps which are taken in response to a data cache miss in some embodiments.

FIG. 6 is a flow diagram showing a sequence of steps which are taken in response to a data cache miss in some embodiments. A consideration of the flow of steps most usefully begins at step 350, where it is established if a data cache miss has occurred. The flow loops upon itself here until this is the case. Thus in the event of a data cache miss the flow proceeds to step 352, where retrieval of the missing cache line is triggered. Then at step 354 (whilst the data cache line retrieval is proceeding), it is determined if the corresponding hash value (e.g. hash value H in the above described example of a cache line L) is present in the hash value cache. If it is, then steps are taken to make the cache line holding this hash value H an eviction candidate, i.e. when allocation into the hash value cache next needs to occur, the cache line holding H will be (or at least is more likely to be) the evicted cache line. This coordination of the control of the data cache and the hash value cache may for example be brought about by the device such as the cache coordination circuitry 250 shown in FIG. 4A and the likelihood of eviction of a given cache line may be influenced by modification of metadata associated with that cache line, for example such as the priority value 268 shown in FIG. 4B. The priority value 268 may for example be a 2-bit value, such that a range of 4 priorities can be defined.

Figure 7:
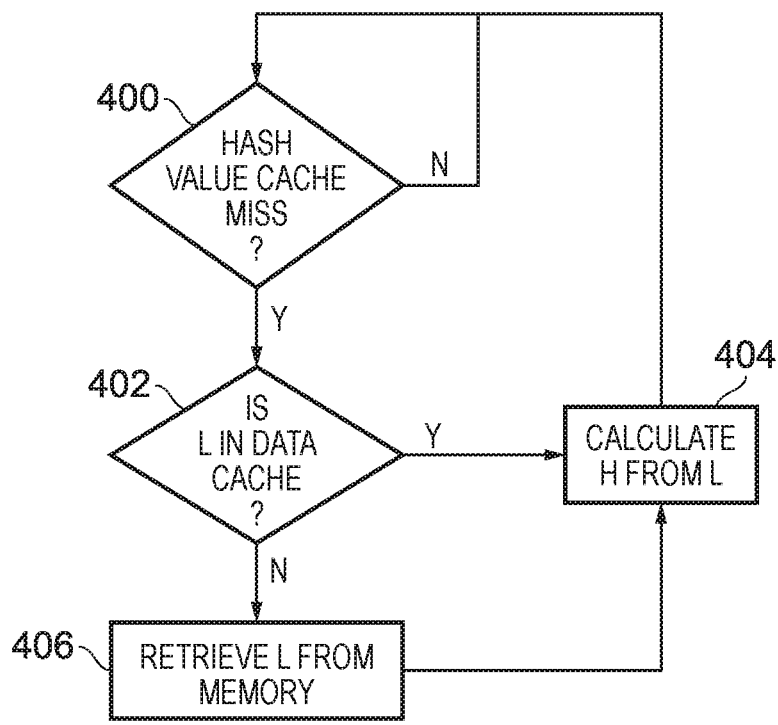
FIG. 7 is a flow diagram showing a sequence of steps which are taken when a hash value cache miss occurs in some embodiments.

FIG. 7 is a flow diagram showing a sequence of steps which are taken when a hash value cache miss occurs in some embodiments. A consideration of the flow of steps most usefully begins at step 400, where it is established if a hash cache miss has occurred. The flow loops upon itself here until this is the case. Thus in the event of a hash cache miss the flow proceeds to step 402, where it is determined if the corresponding data cache line (e.g. cache line L in the above described example of a hash value H) is present in the hash value cache. If it is, then the flow proceeds to step 404 and the required hash value H is calculated from the data cache line L. However if the lookup for the corresponding data cache line also misses, then the flow proceeds to step 406 where the data cache line L is retrieved from memory. Once the data cache line L has been retrieved, at step 404, the hash value H can be calculated from it. As in the case of FIG. 6, the coordination of the control of the data cache and the hash value cache may for example be brought about by the device such as the cache coordination circuitry 250 is shown in FIG. 4A.

Figure 8A:
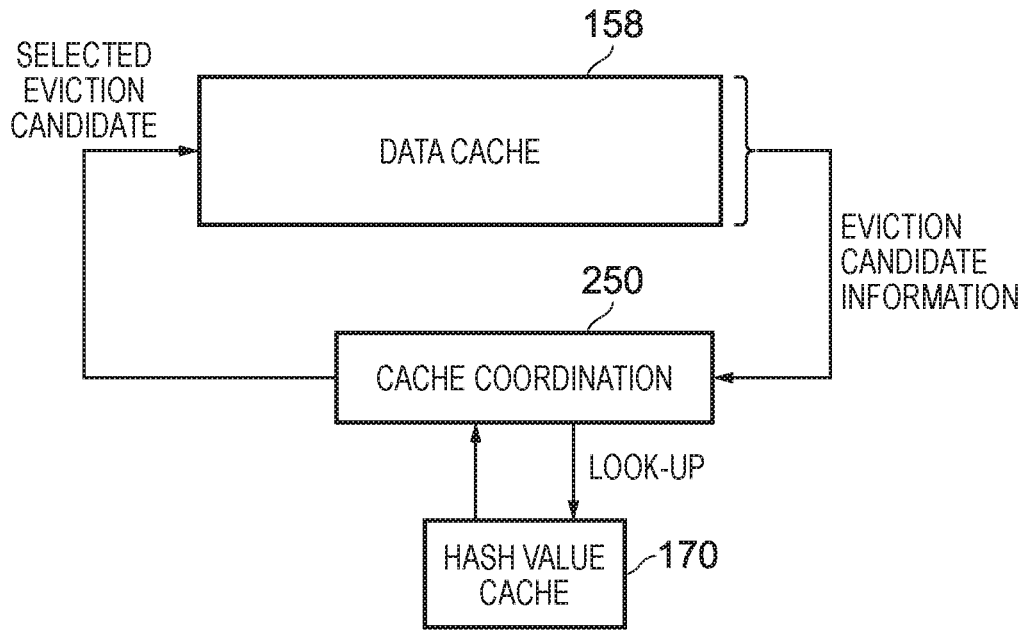
FIG. 8A schematically illustrates the manner in which cache coordination circuitry influences the selection of an eviction candidate in a data cache on the basis of a lookup in a hash value cache in some embodiments.
Figure 8B:
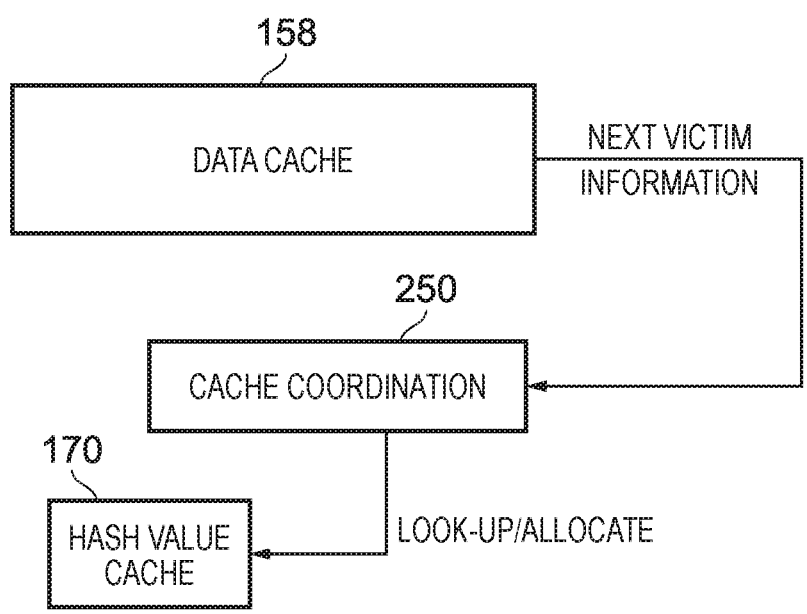
FIG. 8B schematically illustrates the manner in which cache coordination circuitry influences the storage of hash values in a hash value cache on the basis of information relating to a victim cache line in a data cache in some embodiments.

FIGS. 8A, 8B, and 8C schematically illustrate various ways in which cache coordination circuitry can influence the content held by either or both of the data cache and the hash value cache. FIG. 8A schematically illustrates the manner in which cache coordination circuitry influences the selection of an eviction candidate in a data cache on the basis of a lookup in a hash value cache in some embodiments. The data cache 158, cache coordination circuitry 250, and hash value cache 170 of the example of FIG. 4A are used here for illustrative purposes. The cache control circuitry 250 receives information relating to data cache line eviction candidates from the data cache 158. For example, this information may comprise some or all of the metadata 264, 266, 268. Further, this information may comprise other information, such as an indication of the one or more intended victim cache lines, as determined by the cache control circuitry 252 as part of its administration of the data cache 158. The cache coordination circuitry 250 can determine whether a given hash value is currently present in the hash value cache 170 (either by non-invasive check or by triggering a lookup which will result in the hash value being brought into the hash value cache in response to a miss). Dependent on the current content of the hash value cache 170, cache coordination circuitry 250 can indicate a selected eviction candidate to the data cache 158 (i.e. to its control circuitry 252), chosen on the basis of the cache coordination circuitry's knowledge of the content of the hash value cache. The likelihood of eviction of a given data cache line can be influenced by the cache coordination circuitry 250 by causing the modification of relevant metadata (such as the priority value 268) associated with the data cache line under the control of the data cache control circuitry 252.

FIG. 8B schematically illustrates the manner in which cache coordination circuitry can influence the storage of hash values in a hash value cache on the basis of information relating to a victim cache line in a data cache in some embodiments. Once more the data cache 158, cache coordination circuitry 250, and hash value cache 170 of the example of FIG. 4A are used here for illustrative purposes. The cache control circuitry 250 receives information indicating a selected cache line which is (or will be) the victim cache line when an allocation occurs. The cache coordination circuitry 250 can cause a lookup/allocation in the hash value cache for a related hash value line H (or H') on the basis of the indication that data cache line L is the victim cache line.

Figure 9:
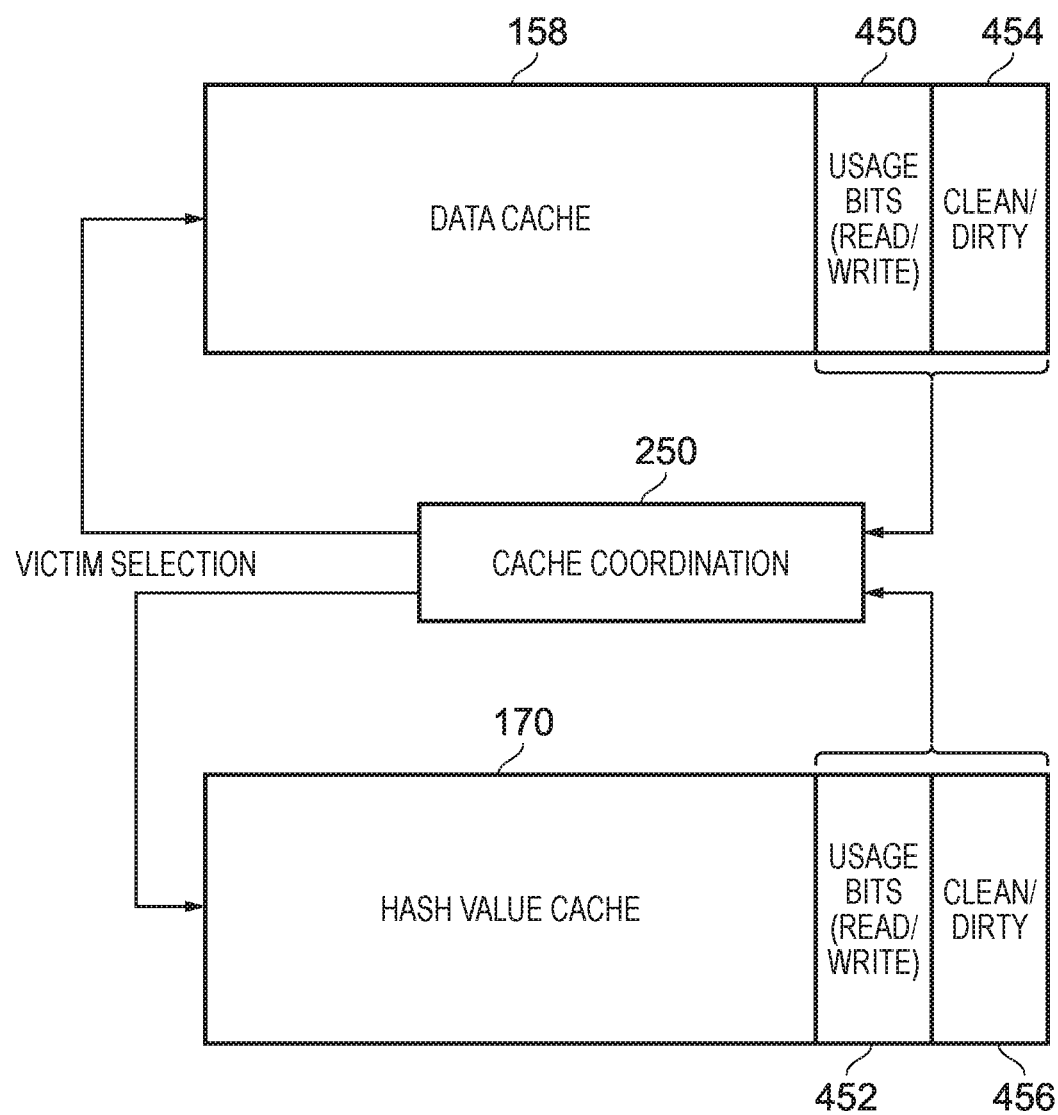
FIG. 9 schematically illustrates the manner in which cache coordination circuitry influences or controls victim selections in a data cache and a hash value cache on the basis of usage and/or modification information from the hash value cache and the data cache in some embodiments.

FIG. 9 schematically illustrates the manner in which cache coordination circuitry can influence or control victim selections in a data cache and a hash value cache on the basis of usage and/or modification (clean/dirty) information from the hash value cache and the data cache in some embodiments. Again, the data cache 158, cache coordination circuitry 250, and hash value cache 170 of the example of FIG. 4A are used here for illustrative purposes. The cache control circuitry 250 receives metadata from each of the data cache 158 and hash value cache 170, which in the example of FIG. 9 comprise usage bits 450, 452 and clean/dirty bits 454, 456. The usage bits 450, 452 indicate whether the usage of the corresponding cache line has been read, write, or both. The clean/dirty bits 454, 456 indicate whether the corresponding cache line is unmodified since its retrieval from memory or has been modified (and therefore will have to be written back to memory when evicted). The cache coordination circuitry 250 brings this information together in order to generate victim selection indications for the data cache 158 and hash value cache 170. For example via causing modification of the priority value 268 associated with a given cache line the cache coordination circuitry can make that cache line a more likely candidate victim line.

Accordingly a wide range of coordinated cache policies for the data cache 158 and hash value cache 170 can be operated. Some example policies are given below:
Filling the data cache:
   When a line L is brought into the data cache from off-chip memory, both H and H' need to be inspected as part of the integrity checks. Caching H' at this point allows for an expedited eviction of a modified ('dirtied') L at some later point in time.

Writing to the Cache
As the cache fills to capacity (or rather, notionally at a point prior to reaching a "full" state), a candidate victim L (or victims) is selected and the hash-cache can be caused to be pre-populated with the hash value H' of its paired line L', such that the victim line L can more quickly be written back to memory.

A data cache line L may be preferentially chosen as an eviction candidate if its partner hash value H' is already present in the hash value cache, since L can be more expediently evicted than another data cache line for which this is not the case. Depending on the implementation a choice can be made between this approach and following the underlying 'standard' replacement policy (which would need L' to be fetched in order to compute its hash value).

Preferentially holding an updated hash value H in the hash value cache can be chosen when:
the associated line L' is likely to be written to in the near future; or
when line L is likely to be written to again in the near future.

Cache Coherence
When an exclusive storage policy it not implemented (i.e. a data value L and its corresponding hash value H can each be held at the same time in their respective caches), the state of H can be maintained coherently (i.e. H is updated when L is updated).

Coordinated cache replacement policies can for example:
Preferentially hold L and H (clean) when L' is likely be read.
Preferentially hold L and H (dirty) when L is likely to be written to, or when L' is likely to be read.
Preferentially hold L and H' when L is likely to get written to, or when L' is likely to be read.

Other trade-offs can be balanced depending on the implementation, for example on the one hand holding H and H' in the hash value cache in the absence of L in the data cache permits a fast store to L and reduces bandwidth for L line fills, yet on the other hand the absence of L from the data value cache indicates that L is not recently used (assuming some form of least-recently-used based underlying replacement policy)

In brief overall summary apparatuses and method are disclosed for protecting the integrity of data stored in a protected area of memory. Data in the protected area of memory is retrieved in data blocks and an authentication code is associated with a memory granule contiguously comprising a first data block and a second data block. Calculation of the authentication code comprises a cryptographic calculation based on a first hash value determined from the first data block and a second hash value determined from the second data block. A hash value cache is provided to store hash values determined from data blocks retrieved from the protected area of the memory. When the first data block and its associated authentication code are retrieved from memory, a lookup for the second hash value in the hash value cache is performed, and a verification authentication code is calculated for the memory granule to which that data block belongs. The integrity of the first data block is contingent on the verification authentication code matching the retrieved authentication code.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:
1. Apparatus comprising:
a memory protection circuitry to verify integrity of memory granules in a protected area of a memory;
a hash value cache to store hash values determined from data blocks retrieved from the protected area of the memory, wherein:
when retrieval from the memory of a first data block and an authentication code associated with a memory granule contiguously comprising the first data block and a second data block occurs, the memory protection circuitry is responsive to the retrieval to calculate a verification authentication code for the memory granule, wherein integrity of the first data block is contingent on the verification authentication code matching the authentication code,
calculation of the verification authentication code comprises a cryptographic calculation based on a first hash value determined from the first data block and a second hash value determined from the second data block, and
the memory protection circuitry is arranged to lookup the second hash value in the hash value cache when the calculation of the verification authentication code is required;
a data block cache to store copies of data blocks retrieved from the memory, wherein the copies of data blocks are cache lines of the data block cache; and
a cache content coordination control circuitry configured to:
control storage of the copies of data blocks in the data block cache dependent on content of the hash value cache,
control storage of the hash values in the hash value cache dependent on content of the data block cache,
administer a victim selection policy for the data block cache and/or the hash value cache, and
impose an exclusive storage policy on the data block cache and the hash value cache, such that for a data block and an associated hash value exclusively either the data block is stored in the data block cache or the associated hash value is stored in the hash value cache.

2. The apparatus as claimed in claim 1, wherein the cryptographic calculation comprises a linear combination of the first hash value and the second hash value in a finite field defined by a set of all possible values which can be represented by the apparatus for each of the first hash value and the second hash value.

3. The apparatus as claimed in claim 2, wherein the linear combination comprises multiplying at least one of the first hash value and the second hash value by a constant.

4. The apparatus as claimed in claim 2, wherein the linear combination comprises multiplying the first hash value by a first constant and multiplying the second hash value by a second constant.

5. The apparatus as claimed in claim 3, wherein the constant is a secret key value.

6. The apparatus as claimed in claim 4, wherein the first constant is a first secret key value and the second constant is a second secret key value.

7. The apparatus as claimed in claim 1, wherein the cache content coordination control circuitry is arranged to administer the victim selection policy for the data block cache, in which: a likelihood of selection of a victim data block is increased when, for a further data block contiguously forming a memory granule with the victim data block, a hash value determined from the further data block is presently stored in the hash value cache.

8. The apparatus as claimed in claim 1, wherein the cache content coordination control circuitry is arranged to administer the victim selection policy for the data block cache, in which: prior to an eviction from the data block cache being required, a victim data block is selected; and for a further data block contiguously forming a memory granule with the victim data block, a hash value determined from the further data block is caused to be stored in the hash value cache.

9. The apparatus as claimed in claim 1, further comprising data block usage storage to store usage indications for the data blocks, and wherein the cache content coordination control circuitry is arranged to administer the victim selection policy for the data block cache, in which: a likelihood of selection of a victim data block is decreased when, for a further data block contiguously forming a memory granule with the victim data block, the usage indications show usage of the further data block above a predetermined threshold.

10. The apparatus as claimed in claim 1, further comprising data block usage storage to store usage indications for the data blocks, and wherein the cache content coordination control circuitry is arranged to administer the victim selection policy for the hash value cache, in which: a likelihood of selection of a victim hash value is decreased when, for a further data block contiguously forming a memory granule with a data block from which the victim hash value is determined, the usage indications show usage of the further data block above a predetermined threshold.

11. The apparatus as claimed in claim 10, wherein the victim hash value is clean and the usage of the further data block is reading of the further data block.

12. The apparatus as claimed in claim 1, further comprising data block usage storage to store usage indications for the data blocks, and wherein the cache content coordination control circuitry is arranged to administer the victim selection policy for the hash value cache, in which: a likelihood of selection of a victim hash value is decreased when the victim hash value is dirty and the usage indications show usage of the data block above a predetermined threshold and the usage of the data block is writing to the data block.

13. The apparatus as claimed in claim 1, wherein the cache content coordination control circuitry is responsive to a read access to a data block in the data block cache to trigger a look-up for a corresponding hash value in the hash value cache.

14. The apparatus as claimed in claim 1, wherein the cache content coordination control circuitry is responsive to a write access to a data block in the data block cache to trigger a look-up in the hash value cache for a further hash value determined from a further data block contiguously forming a memory granule with the data block.

15. The apparatus as claimed in claim 13, wherein when the look-up for the corresponding hash value results in a miss in the hash value cache, allocation of the hash value into the hash value cache is suppressed.

16. The apparatus as claimed in claim 1, further comprising encrypted storage for the hash values, wherein the cryptographic calculation is a linear combination of an encrypted first hash value determined from the first data block and an encrypted second hash value determined from the second data block, wherein the encrypted first hash value and the encrypted second hash value are retrieved from the encrypted storage for the hash values.

17. A method of verifying integrity of memory granules in a protected area of a memory, comprising:
    storing in a hash value cache hash values determined from data blocks retrieved from the protected area of the memory;
    calculating, when retrieval from the memory of a first data block and an authentication code associated with a memory granule contiguously comprising the first data block and a second data block occurs, a verification authentication code for the memory granule, wherein integrity of the first data block is contingent on the verification authentication code matching the authentication code,
    wherein calculating the verification authentication code comprises a cryptographic calculation based on a first hash value determined from the first data block and a second hash value determined from the second data block;
    looking-up the second hash value in the hash value cache when the calculation of the verification authentication code is required; and
    storing copies of data blocks retrieved from the memory in a data block cache dependent on content of the hash value cache, wherein the copies of data blocks are cache lines of the data block cache,
    wherein storage of the copies of data blocks in the data block cache is controlled dependent on content of the hash value cache, and storage of the hash values in the hash value cache is controlled dependent on content of the data block cache;
    administering a victim selection policy for the data block cache and/or the hash value cache, and
    imposing an exclusive storage policy on the data block cache and the hash value cache, such that for a data block and an associated hash value exclusively either the data block is stored in the data block cache or the associated hash value is stored in the hash value cache.

* * * * *